(12) United States Patent
Alrajhi

(10) Patent No.: US 11,427,043 B2
(45) Date of Patent: Aug. 30, 2022

(54) TRAILER FOR LIFTING AND TRANSPORTING LOADS

(71) Applicant: Fahad Alrajhi, Riyadh (SA)

(72) Inventor: Fahad Alrajhi, Riyadh (SA)

( * ) Notice: Subject to any disclaimer, the term of this patent is extended or adjusted under 35 U.S.C. 154(b) by 331 days.

(21) Appl. No.: 16/324,804

(22) PCT Filed: Aug. 9, 2016

(86) PCT No.: PCT/SA2016/000012
§ 371 (c)(1),
(2) Date: Feb. 11, 2019

(87) PCT Pub. No.: WO2018/030922
PCT Pub. Date: Feb. 15, 2018

(65) Prior Publication Data
US 2019/0168553 A1    Jun. 6, 2019

(51) Int. Cl.
| | | |
|---|---|---|
| *B60D 1/24* | (2006.01) |
| *B60P 1/34* | (2006.01) |
| *B60D 1/46* | (2006.01) |
| *B60P 1/02* | (2006.01) |

(52) U.S. Cl.
CPC .............. *B60D 1/247* (2013.01); *B60D 1/465* (2013.01); *B60P 1/025* (2013.01); *B60P 1/34* (2013.01)

(58) Field of Classification Search
CPC ......... B60D 1/247; B60D 1/465; B60P 1/025; B60P 1/34
USPC ........................................................ 280/405.1
See application file for complete search history.

(56) References Cited

U.S. PATENT DOCUMENTS

| | | |
|---|---|---|
| 5,288,197 A | 2/1994 | Harris |
| 5,415,516 A * | 5/1995 | Richards ................. B60P 1/025 187/234 |
| 5,584,639 A | 12/1996 | Walker, Jr. |
| 5,951,233 A | 9/1999 | Boucher et al. |
| 7,044,704 B1 | 5/2006 | Roose |

FOREIGN PATENT DOCUMENTS

WO             01/02237 A        1/2001

* cited by examiner

*Primary Examiner* — Jacob B Meyer
*Assistant Examiner* — Felicia L. Brittman
(74) *Attorney, Agent, or Firm* — Nath, Goldberg & Meyer; Jerald L. Meyer

(57) ABSTRACT

The present invention relates to a tow trailer having a structure (5) for lifting and transporting cargo and unloading them, the trailer is drawn by a suitable tow apparatus. The trailer comprises a lifting device (1) to lift and unload the cargo, wherein the lifting device is coupled to forks. The trailer moves stably due to mounting the lifting device stably in a part of the front side of the trailer, and the presence of wheels mounted in both sides thereof. The trailer has a bar (8) in the rear side, and it also has one or more barriers (7) in the middle of the trailer so as to be under the cargo. The trailer is provided with a trailer jack (2) mounted in the bearing positions of the trailer in order to stabilize it during lifting or unloading the cargo.

14 Claims, 13 Drawing Sheets

TRAILER FOR LIFTING AND TRANSPORTING LOADS

This is a National Phase Application filed under 35 U.S.C. 371 as a national stage of PCT/SA2016/000012, filed 9 Aug. 2016, the content of each of which is hereby incorporated by reference in its entirety.

BACKGROUND OF THE INVENTION

The difficulty of dealing with heavy cargo in general, in particular, in the projects in the remote regions. The available solutions are expensive in terms of providing a forklift in each site or employ a large number of workers. The disadvantage of the first solution is the high cost of investment in rarely used essentials, and the disadvantage of the second solution is the difficulty of obtaining workers.

In view of the prior art, the US patent application no. 2008/0073873 for Brown J C and others, wherein there is a number of differences between this document and the presently claimed invention, the most important are as follows:
a) In the prior art, the weight loading is on three centers, the two wheels and the front, while the present invention has the weight center on the front (fork loader), the rear (rear barrier for the fork loading), and the middle (a middle barrier or more tolerate a part of the weight of the fork or the cargo).
b) In the prior art, the lifting method is that the body of the trailer is raised and accordingly the fork is raised, i.e. the fork does not move independently, while the present invention uses the lifting method for the fork while the vehicle body is static.
c) The prior art works efficiently on two-wheels vehicle because they are considered as a lifting axis, while the mechanism of action of the method of the present application is based on a trailer (vehicle) with multiple number of wheels because its purpose is moving the vehicle and it has nothing to do with lifting and unloading.
d) The US model is suitable for the small weights that fit the capacity of the two wheels to tolerate the weight, while the present invention tolerates and fits the large weights due to the possibility of increasing the number of wheels as desired and needed.
e) The prior art is suitable for short lengths, while the present invention gives more options for the length.
f) In the prior art, the lifting method is horizontal and forcing the cargo to incline with a small inclination when the loading is completed as shown in FIGS. 14 and 15), while the lifting method of the present invention is horizontal and able to incline on the way of the forklift.

The aim of the present invention is finding solutions for the aforementioned problems, so as to combine loading and transporting the cargo in one device with an economical, feasible and low cost method in terms of using devices and workers.

As shown in the attached figures.

GENERAL DESCRIPTION OF THE INVENTION

According to one aspect of the present invention, the invention provides a trailer incorporated with a lifter, or wherein the trailer is in the form of a closed-sides structure except the rear side, the trailer moves on wheels mounted on its both sides. The trailer comprises a lifting device "lifter" (1) mounted to the front of the trailer as a preferred model for the invention application, and this is by suitable fixing (pulling) mean such as cables. Wherein the trailer comprises forks to load and lift the cargo, the forks would also be replaced with a horizontal plane surface or semi-plane to conform with the wheeled cargo. The trailer comprises a trailer jack 2 to stabilize it during lifting and unloading the cargo, as well as a bar (backstop) mounted on the open side (the rear side of the trailer), the trailer also comprises one barrier at least mounted in the middle of the trailer connect in one of the bar sides to one of the trailer sides, further, the trailer comprises a device to elongate the fork to direct the cargo in case of using the fork technique to enter the path of the cargo (such as the pallet) in the fork safely.

DETAILED DESCRIPTION

Figure 1:
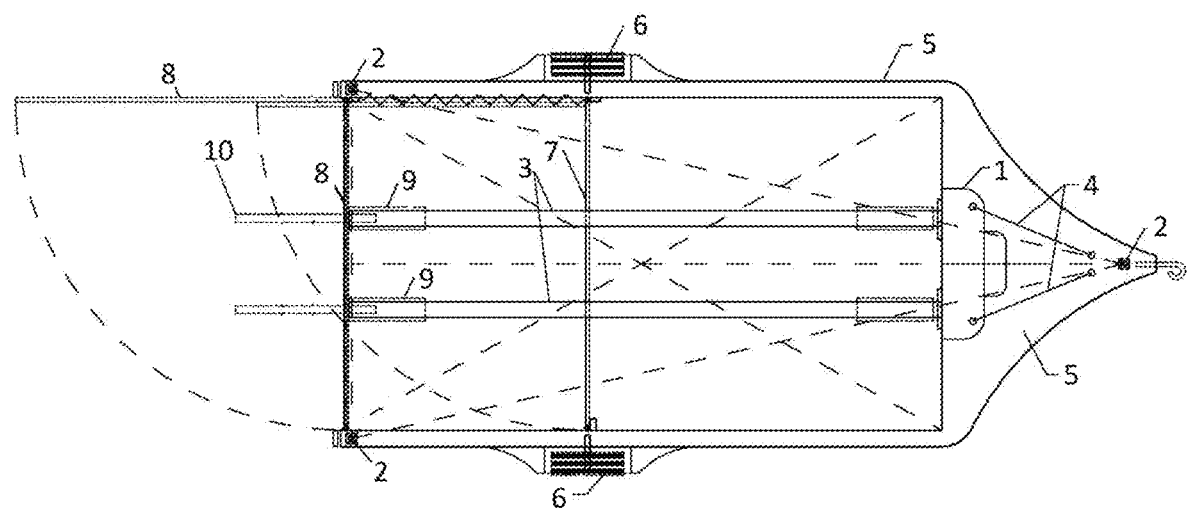
FIG. 1: a top view of a trailer showing forks and fixture cylinders thereof.
Figure 2:
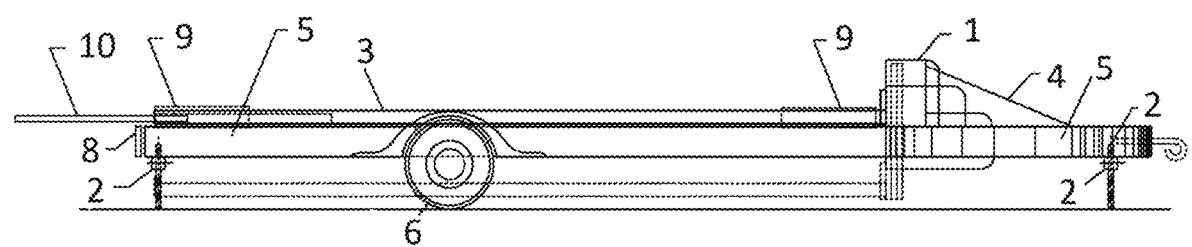
FIG. 2: a side-view of the trailer.
Figure 3:
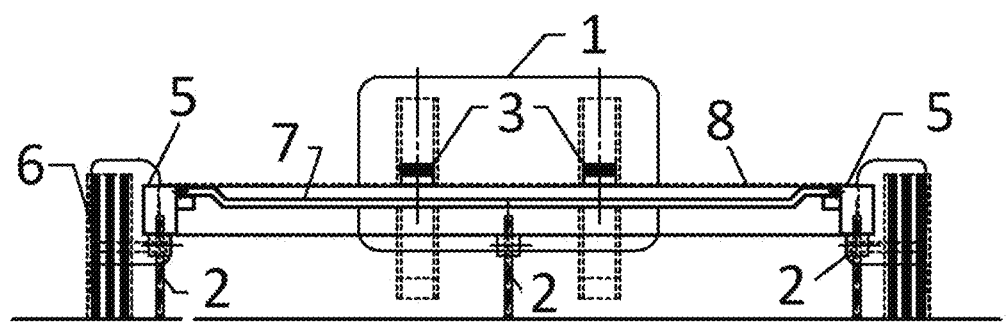
FIG. 3: a rear-view of the trailer.
Figure 4:
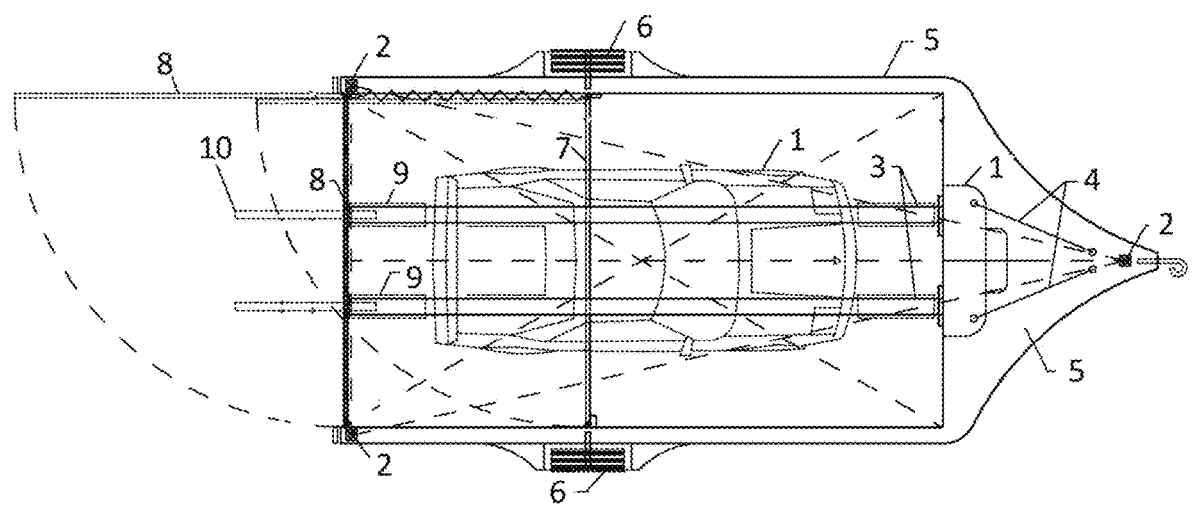
FIG. 4: a top view of the trailer showing the trailer carrying exemplary moving type or wheeled cargo.
Figure 5:
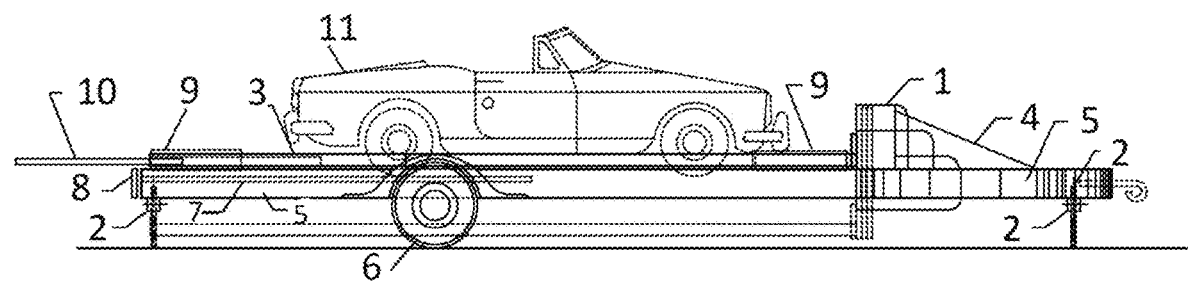
FIG. 5: a side-view of the trailer of FIG. 4.
Figure 6:
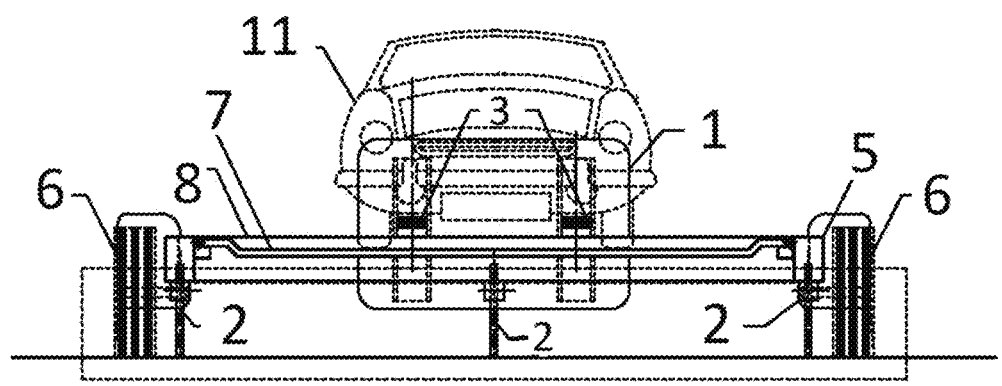
FIG. 6: a rear-view of the trailer of FIG. 4.
Figure 7:
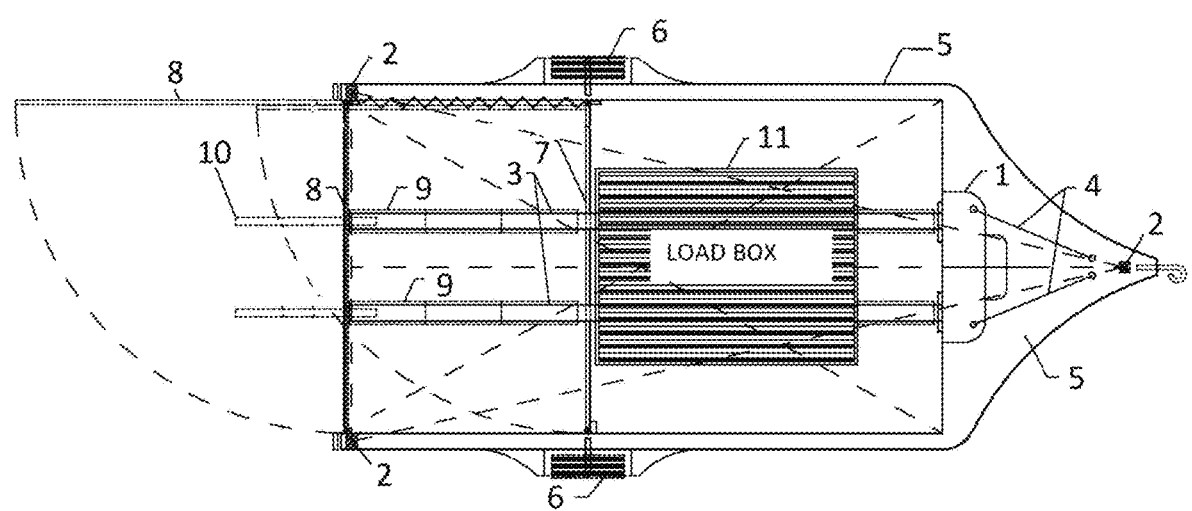
FIG. 7: a top view of the trailer showing the trailer carrying exemplary stable type or non-wheeled cargo.
Figure 8:
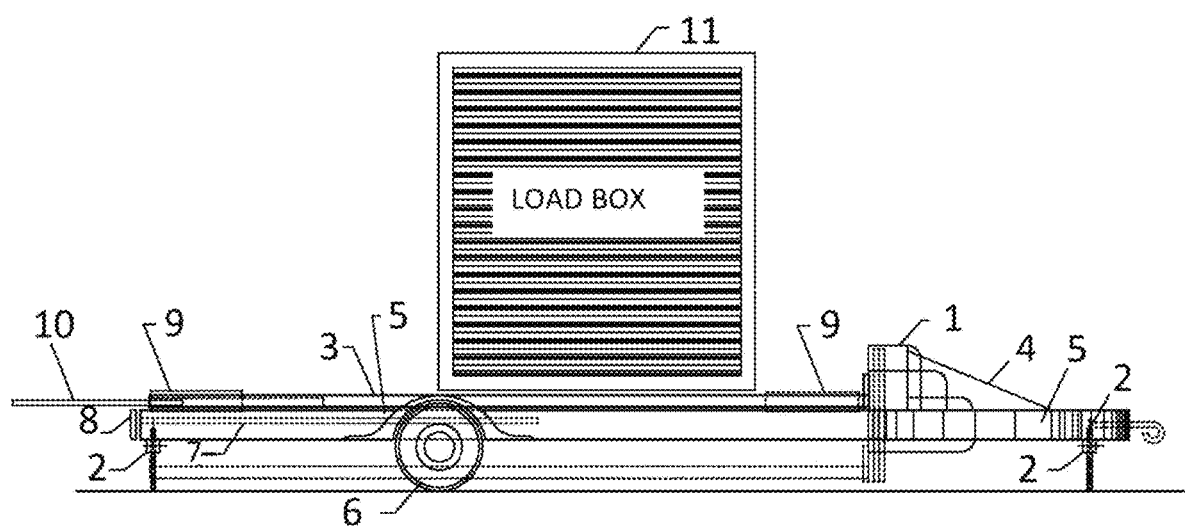
FIG. 8: a side-view of the trailer of FIG. 7.
Figure 9:
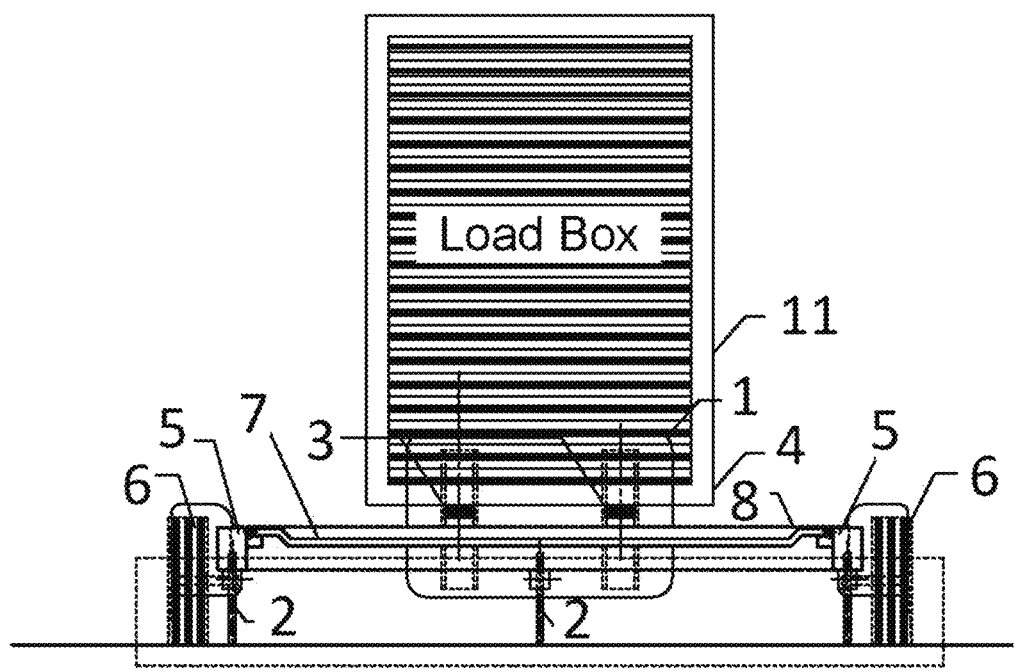
FIG. 9: a rear-view of the trailer of FIG. 7.
Figure 10:
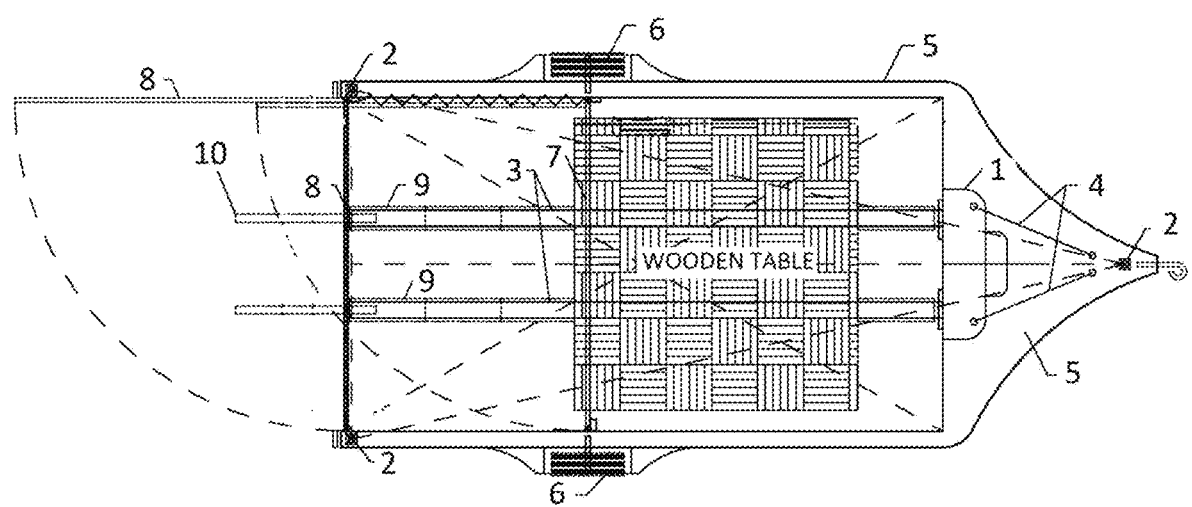
FIG. 10: a top view of the trailer showing the trailer carrying exemplary stable type or non-wheeled cargo.
Figure 11:
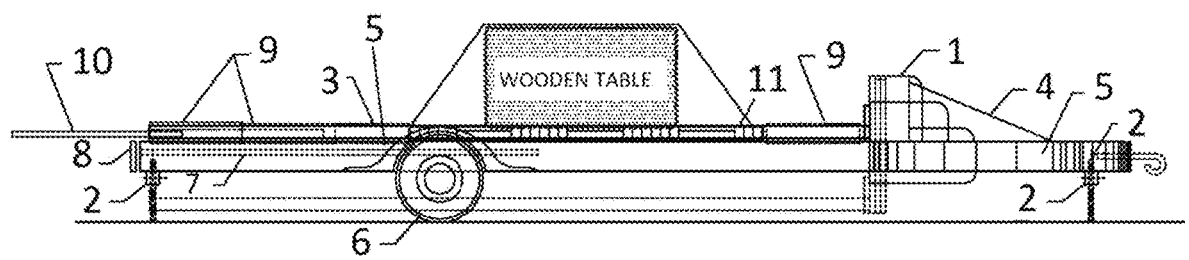
FIG. 11: a side-view of the trailer of FIG. 10.
Figure 12:
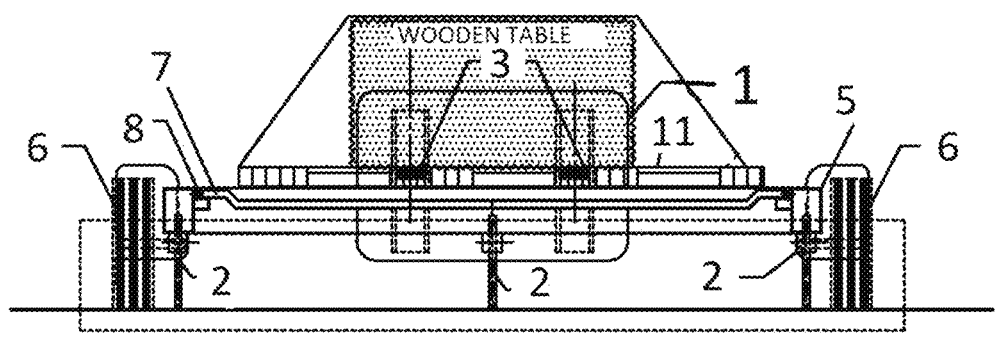
FIG. 12: a rear-view of the trailer of FIG. 10.
Figure 13:
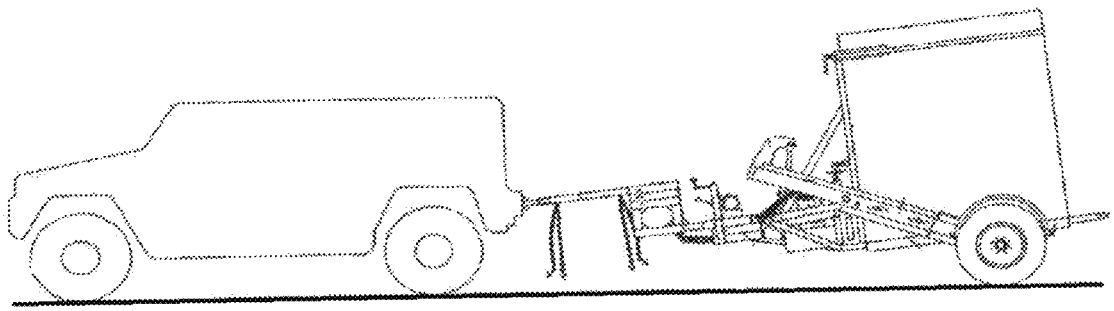
FIG. 13: a side view showing prior art loading and moving.

The invention is a trailer 5 incorporated with a lifter 1 towing the trailer by a vehicle or any suitable towing device by coupling with a hitch coupler mounted in a part of the front side of the trailer 2, And according to FIGS. 1 to 12, a trailer manufactured according to preferred embodiment of this invention generally includes the following:

The trailer 5 designed in the form of a U-shape structure (as a preferred shape in the invention application) hollow inside, closed in three sides and opened in the rear side, a suitable number of wheels 6 is mounted to both right and left sides of the trailer, a lifting device "lifter" 1 is mounted to the front side of the trailer 5 which is a forklift 3 coupled to forks with a number suitable to the size and the dimensions of the trailer (such as, two forks), or a horizontal plane surface with the desired inclination degrees and connected to the lifter and extending inside the trailer from the front to the rear (wherein the fork or the surface are used with respect to the type of the cargo 11 and their weight). The forks are used, for example, for loading the pallets or boxes and the like. The lifter 1 is mounted by a suitable fixing mean such as cables 4 to the front side of the structure of the rigid base to tolerate the weight of the lifter, wherein the two forks or the plane surface 3 are coupled to the lifter 1 so as to be able to lift the cargo 11 stably, A trailer jack 2 is mounted to the trailer in the points of gravity of the trailer, which is the point of bearing of the lifter and the two points of mounting the wheels as shown in any of the two FIG. 2 or 3, wherein the trailer jack stabilizing the trailer while loading and unloading. A fixture cylinder 9 is used in case that the cargo 11 is shorter than the fork and the purpose is stabilizing the cargo from moving or falling and determining the most suitable site for the cargo. In the rear opened side of the trailer, a bar (backstop) 8 is mounted wherein one of its ends is mounted to one of the trailer sides so as to be parallel to the front rib of the lifter 1 wherein this bar carries a part of the weight of the cargo 11 after lifting it and getting ready to move, and rotates pivotally to allow the cargo 11 to enter or exit the trailer 5 in order to free the fork (or the plane surface) 3 and the cargo 11 at the vertical loading and unloading. Also the bar (backstop) 8 is provided with light signals for warning during moving in the roads, wherein the bar also reduces the damages of back collisions. The trailer 5 is provided with one barrier at least in its middle under the cargo 11 in case of closing so as to be connected between both sides of the trailer 5 (the right and the left sides) to tolerate a part of the cargo weight and distribute the weight on the parts of the trailer and mounted by a joint on the side rib of the trailer (the right and the left sides) and rotates pivotally to unload the middle of the trailer from the obstructions of loading and unloading. The fork 3 is connected to a fork extension 10 to elongate the fork and it is suitable that the extension is sliding, removable, or mounted by a joint that makes it foldable to direct the cargo 11 when using the forks technique to enter the path of the cargo(such as pallet) in the fork safely and limits the collision of the trailer 5 when moving backward with the cargo.

The following is a clarification of the methods of lifting and unloading the cargo:

The method of lifting the cargo by the fork and the cargo is stable (non-wheeled) (FIGS. 7-12):

After connecting the trailer 5 to a towing device (such as, vehicle), the rear bar 8 and the barrier 7 are opened pivotally wherein inside the trailer is empty except the fork 3 that is moved down to the land after inserting the fixture cylinders 9 in case that the fork has a length suitable to the weight of the cargo 11 (box, pallet or the like) in order to establish the cargo in the right position in the trailer 5 and using the directing extension to elongate the fork 8 and then moving backward to the place of the cargo to enter the fork 3 under the cargo 11 (such as, pallet or any type of cargo) so as the cargo becomes over the fork, then the fork lifts this cargo and the fixture cylinders 9 are inserted behind the cargo relative to the fork to be mounted between the cargo and the rear bar 8 after closing it and the barrier 7 is closed as well to be with the bar connecting between both right and left sides of the trailer under the fork and tolerating part of the weight and then the vehicle moves with towing the trailer from behind to the desired destination site of the cargo.

The method of unloading the cargo by the fork and the cargo is stable (non-wheeled) (FIGS. 7-12):

After arriving to the destination and choosing the suitable site to unload the cargo 11, the fork 3 is slightly lifted so as the fork is not in contact with the barrier 7 and the rear bar then the bar 8 and the barrier are opened pivotally as a typical application so as they do not obstruct setting the cargo free wherein inside the trailer is empty except the fork 3 that carries the cargo 11 then the fork is moved down to the land after setting the rear fixture cylinders 9 free and the weight of the cargo becomes on land then moving forward to free the trailer 5 from the cargo, then the fork is lifted, the bar and the barrier are closed, then the fork is moved down on them.

The method of lifting the cargo by plane and semi-plane surfaces for the moving cargo (wheeled) (FIGS. 4-6):

After connecting the trailer 5 to the towing device (such as, vehicle) the rear bar 8 and the bar are opened pivotally as a typical application so as they do not obstruct setting the cargo free wherein inside the trailer is empty except the plane surfaces 3 (FIG. 5) that is moved down to the land, the cargo 11 is moved (such as, vehicle) to enter inside the trailer 5 so as to be over the surface, then this surface lifts this cargo and mount the rear bar after it has been closed and the barrier is closed as well to be with the bar transversely under the surface and they tolerate part of the weight and then the vehicle (towing the trailer) is moved and towing the trailer from behind to the desired destination site of the cargo.

The method of unloading the cargo by plane and semi-plane surfaces for the moving cargo (wheeled) (FIGS. 4-6):

After arriving to the destination and choosing the suitable site to unload the cargo 11, the surface 3 is slightly lifted so as the surface is not in contact with the barrier 7 and the rear bar 8 then the bar and the barrier are opened pivotally so as they do not obstruct setting the cargo free wherein inside the trailer is empty except the surface that carries the cargo 11 (such as, vehicle) then the surface is moved down to the land then the cargo is moved outside the trailer, then the surface is lifted, the bar and the barrier are closed, and the surface is moved down on them.

The Components:

A lifter 1, crane, an electrical lifter "winch", hydraulic lifter, farming car jack, cable pullers, puller chain, gas springs, hydraulics, a forklift, or any horizontal, vertical or pivotal lifting or pushing method.

A trailer jack 2 to stabilize the trailer during loading and unloading.

One fork or more or a surface 3 with a horizontal or inclined angle and to be metal or any rigid material being connected to the lifter 1 and extending backwardly and parallel to both right and left sides of the trailer, and it is possible to apply a surface with any shape such as the application of the vehicle example.

A cable, arm or bar 4 to pull the lifter and limits the possibility that the lifter would be inclined or broken during loading.

The main structure 5 of the trailer in a U-shape hollow inside and closed from three sides, the front, right and left sides are connected to the wheels and the rear side is opened.

Wheels 6 characterized by being fixable in choosing the suitable number.

One barrier or more being under the cargo in case of closing.

A rear bar 8 provided with light signals which is a bar parallel to the front side of the trailer.

A fixture cylinder 9 used in case the cargo was shorter that the fork.

An extension 10 to elongate the fork 3 to direct the cargo in case of using the fork 3 technique to enter the path of the cargo (such as, pallet) in the fork safely.

Examples of various applications of the cargo 11: box loading by the fork method; pallet loading by the fork method; vehicle loading by the surface method.

The invention claimed is:

1. A tow trailer to lift and transport cargo, wherein the trailer includes a hollow-inside structure mounted on wheels, and the trailer further has one side opened to insert the cargo into and remove the cargo from the trailer, comprising:

a hitch coupler mounted in the front side of the trailer coupled to the towing device of the trailer;

a lifter, crane or winch, to lift the cargo and move them down, wherein the lifter is mounted by fixing means in the hollow-inside structure of the trailer;

at least one trailer jack for determining the suitable height for the trailer and to stabilize the trailer on land when needed to stabilize the trailer during loading and unloading;

one or more forks connected to the lifter to lift or unload the cargo; or a horizontal plane surface to load, lift and unload the cargo, the horizontal plane surface being connected to the lifter;

one or more barriers mounted to one of the trailer sides and rotates pivotally to empty the middle of the trailer from obstructions during loading and unloading;

a bar in the form of a backstop mounted so as to close the opened side of the trailer and rotates pivotally during loading and unloading;

wherein the bar is parallel to the side to which the lifter is mounted in order to load a part of the weight of the cargo after it has been lifted and getting ready to move;

a fork extension to direct the cargo to a path of the fork safely; and fixture cylinders to stabilize the cargo from moving or falling and determine the most suitable site for the cargo.

2. The tow trailer according to claim 1, wherein the hollow-inside structure is U-shaped, wherein the hollow-inside structure has one opened side and three closed sides.

3. The tow trailer according to claim 1, wherein the hitch coupler and the lifter are in a part of the from side of the trailer.

4. The tow trailer according to claim 1, wherein the lifter is mounted to the hollow-inside structure by suitable means.

5. The tow trailer according to claim 4, wherein the suitable means comprise at least one cable.

6. The tow trailer according to claim 1, wherein the lifter is an electrical lifter, a winch, a hydraulic lifter, a farming car jack, a scissor lift jack, cable pullers, a puller chain, gas springs, hydraulics, or a forklift.

7. The tow trailer according to claim 1, wherein the opened side of the hollow-inside structure is a rear side.

8. The tow trailer according to claim 1, wherein the bar closes the opened side of the trailer and supports both right and left ribs of the vehicle from being diverged due to bumps, weights, transporting and movement factors.

9. The tow trailer according to claim 1, wherein the trailer or the bar is provided with warning means.

10. The tow trailer according to claim 9, wherein the warning means are mounted to the trailer or the bar, and are light signals.

11. The tow trailer according to claim 1, wherein a barrier is mounted under the cargo in case of closing so as to be connected between both right and left sides of the trailer to tolerate a part of the weight of the cargo and distribute the weight on the parts of the trailer.

12. The tow trailer according to claim 11, wherein one end of the barrier is mounted by a joint to one of the right or the left sides of the trailer.

13. The tow trailer according to claim 1, wherein the fork extension is an extension with a variable length in the rear end of the fork works on directing the cargo to enter the path of the fork safely and limit the collision of the trailer with the cargo when moving backward to load the cargo.

14. The tow trailer according to claim 1, wherein the at least one trailer jack is mounted at the center of gravity of the trailer.

* * * * *